(12) United States Patent
Park

(10) Patent No.: US 8,587,885 B2
(45) Date of Patent: Nov. 19, 2013

(54) FOCUSING DEVICE FOR BEAM PROJECTOR

(75) Inventor: Joong-Wan Park, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 294 days.

(21) Appl. No.: 12/880,510

(22) Filed: Sep. 13, 2010

(65) Prior Publication Data

US 2011/0063744 A1   Mar. 17, 2011

(30) Foreign Application Priority Data

Sep. 11, 2009  (KR) ........................ 10-2009-0085999

(51) Int. Cl.
*G02B 7/02* (2006.01)
*G02B 21/00* (2006.01)
*G02B 9/00* (2006.01)
*G03B 13/00* (2006.01)
*G03B 13/32* (2006.01)

(52) U.S. Cl.
USPC ........... 359/824; 359/611; 359/738; 348/345; 396/89

(58) Field of Classification Search
USPC ......... 359/821–826, 813–814, 691, 694, 700, 359/611, 701, 704, 722, 738–740; 348/345; 396/89
See application file for complete search history.

(56) References Cited

U.S. PATENT DOCUMENTS

| 4,018,520 | A | 4/1977 | Aste |
| 5,150,260 | A | 9/1992 | Chigira |
| 5,631,776 | A | 5/1997 | Weigand et al. |
| 6,553,185 | B1 | 4/2003 | Inaba et al. |
| 2002/0181953 | A1* | 12/2002 | Ichinokawa ................. 396/349 |
| 2008/0024879 | A1* | 1/2008 | Shih et al. ..................... 359/698 |

FOREIGN PATENT DOCUMENTS

| JP | 4-317015 | 11/1992 |
| JP | 7-154723 | 6/1995 |
| JP | 9-021941 | 1/1997 |
| JP | 2004-317986 | 11/2004 |
| JP | 2008-076582 | 4/2008 |

* cited by examiner

*Primary Examiner* — Dawayne A Pinkney
(74) *Attorney, Agent, or Firm* — The Farrell Law Firm, P.C.

(57) ABSTRACT

A focusing device for a beam projector including a casing, a body tube having at least one lens, the body tube being advanced or retracted in a direction of an optical axis in the casing, a movable member provided at a side of the body tube, the movable member moving in parallel with the direction of the optical axis, a bridge fixed to the body tube and coupled with the movable member to cover at least a part of the movable member, and a drive motor fixed in the casing and provided at a side of the body tube, in which the movable member linearly reciprocates as the drive motor operates, whereby the body tube is advanced or retracted.

8 Claims, 7 Drawing Sheets

FOCUSING DEVICE FOR BEAM PROJECTOR

PRIORITY

This application claims priority under 35 U.S.C. §119(a) to a Korean Patent Application filed in the Korean Intellectual Property Office on Sep. 11, 2009 and assigned Serial No. 10-2009-0085999, the entire disclosure of which is hereby incorporated by reference.

BACKGROUND OF THE INVENTION

1. Field of the Invention

The present invention generally relates to a beam projector, and more particularly, to a focusing device for a subminiature beam projector, which is mountable on a small-size device, such as a portable terminal.

2. Description of the Related Art

A beam projector is any device that includes a light source, a liquid crystal panel, and a lens, in which light emitted from the light source goes through the liquid crystal panel and an image displayed on the liquid crystal panel is projected onto a screen. The number of liquid crystal panels or the number of lenses on the beam projector may vary.

The beam projector can project on a large screen compared to its size, and thus has been used variously in conferences, shows, or the like. Recently, with the wide use of portable terminals such as mobile communication terminals, a portable terminal having a subminiature beam projector mounted therein has been commercialized. A portable terminal having a beam projector mounted therein is useful to workers who engage in frequent business trips or conferences.

A beam projector mounted in a compact device, such as a portable terminal, usually has mounted therein a focusing device using a focusing knob such as a dial. A user manipulates the focusing knob to advance or retreat a body tube having a plurality of lens mounted therein in an axial direction. Thus, the focusing knob has to be positioned adjacent to the body tube and be so exposed as to allow the user to manipulate the focusing knob in an outer portion of the device.

Thus, when the beam projector is installed in a compact device such as a portable terminal, the focusing knob limits the installation position of the beam projector. In a compact device having a small part-mounting space, such a problem is a serious constraint on selecting a part-mounting structure. As a result, the conventional beam projector including the focusing device is difficult to mount in a compact device such as a portable terminal.

SUMMARY OF THE INVENTION

An aspect of the present invention is to address at least the above problems and/or disadvantages and to provide at least the advantages described below. Accordingly, an aspect of the present invention is to provide a focusing device for a beam projector, which has no restriction on the mounting position thereof in a portable terminal.

Another aspect of the present invention is to provide a focusing device for a beam projector, which can be easily mounted in a compact device such as a portable terminal by relaxing restrictions on a mounting position thereof.

According to an aspect of the present invention, there is provided a focusing device for a beam projector, the focusing device including a casing, a body tube including at least one lens, the body tube being advanced or retracted in a direction of an optical axis in the casing, a movable member provided at a side of the body tube, the movable member moving in parallel to the direction of the optical axis, a bridge fixed to the body tube and coupled to the movable member to cover at least a part of the movable member, and a drive motor fixed in the casing and provided at a side of the body tube, in which the movable member linearly reciprocates as the drive motor operates, whereby the body tube is advanced or retracted.

The focusing device may further include at least one guide rod extending in parallel in the direction of the optical axis and being fixed to the casing and at least one guide member formed on an outer circumferential surface of the body tube and slidably coupled with an outer circumferential surface of the guide rod, in which the body tube is advanced or retreated by being guided by the guide rod.

The focusing device may further include a holder, formed on the outer circumferential surface of the body tube, in a position spaced apart from the guide member and another guide rod slidably coupled with the holder and passing through the holder to guide the advancing or retracting movement of the body tube, in which an end of the bridge is coupled to cover the both surfaces of the holder.

The focusing device may further include an aligning member, an end of which is fixed to a body of the drive motor and another end of which supports an end portion of the drive shaft of the drive motor, a plurality of aligning grooves formed in the aligning member, and aligning protrusions formed on the casing, in which the aligning member is disposed such that the aligning member is fixed to the casing and the aligning grooves are engaged with the aligning protrusions, respectively.

The focusing device may further include a position detecting sensor mounted on the casing, the position detecting sensor generating a signal for stopping the drive motor according to a position of a body tube.

The position detecting sensor may include a light emitting diode (LED) and a photo diode (PD), the focusing device may further include a reflecting member disposed in a predetermined position in the body tube, and when the body tube moves out of a moving range for focal length control, the reflecting member may be positioned to face the LED and the PD and reflect light emitted from the LED to the PD.

The focusing device for a beam projector structured as described above is easy to scale down, thus being mountable on a portable apparatus. Moreover, focusing is achieved with the drive motor without a need to install a separate focusing knob, thereby expanding the potential locations of the beam device. Accordingly, it is easier to install the beam projector in an apparatus that has a compact mounting space, such as a portable terminal.

By mounting the position detecting sensor using the LED and the PD, it can be detected whether the body tube has moved out of the moving range, thereby protecting the drive motor. Furthermore, to mount the drive motor, the aligning protrusions formed on the casing and the aligning grooves formed in the aligning member fixed to the drive motor are engaged with each other, thereby facilitating alignment of the drive shaft.

BRIEF DESCRIPTION OF THE DRAWINGS

The above and other features and advantages of an embodiment of the present invention will become more apparent from the following detailed description taken in conjunction with the accompanying drawings, in which.

DETAILED DESCRIPTION OF THE PRESENT INVENTION

Hereinafter, various embodiments of the present invention will be described in detail with reference to the accompanying drawings. It is to be noted that a detailed description of a known functions or structures of the present invention will be omitted if it obscures the subject matter of the present invention.

Figure 1:
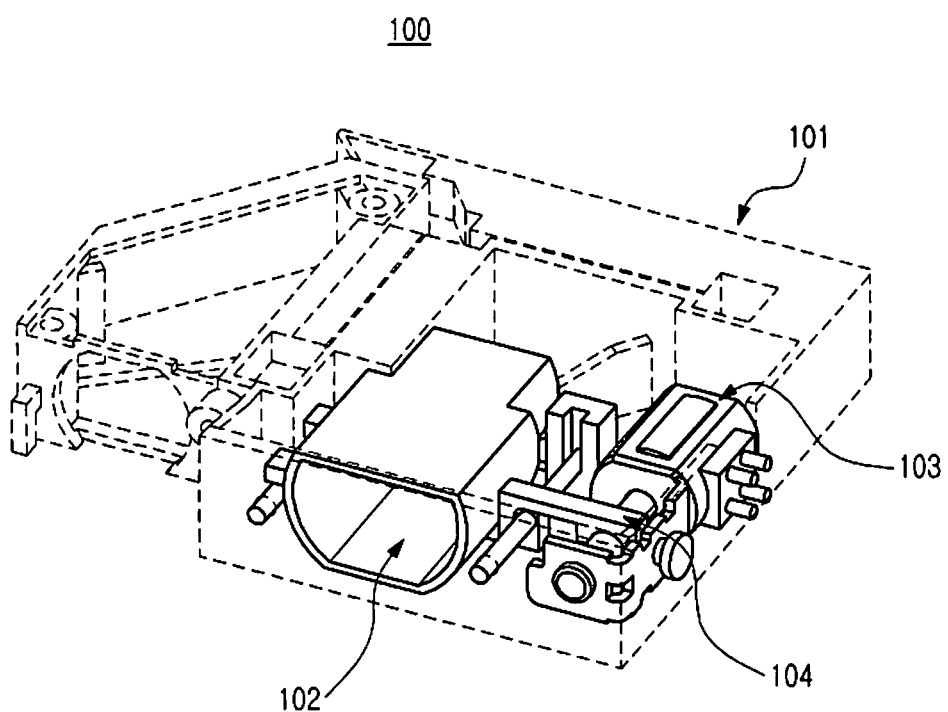
FIG. 1 is a perspective view illustrating a beam projector including a focusing device according to an embodiment of the present invention.
Figure 2:
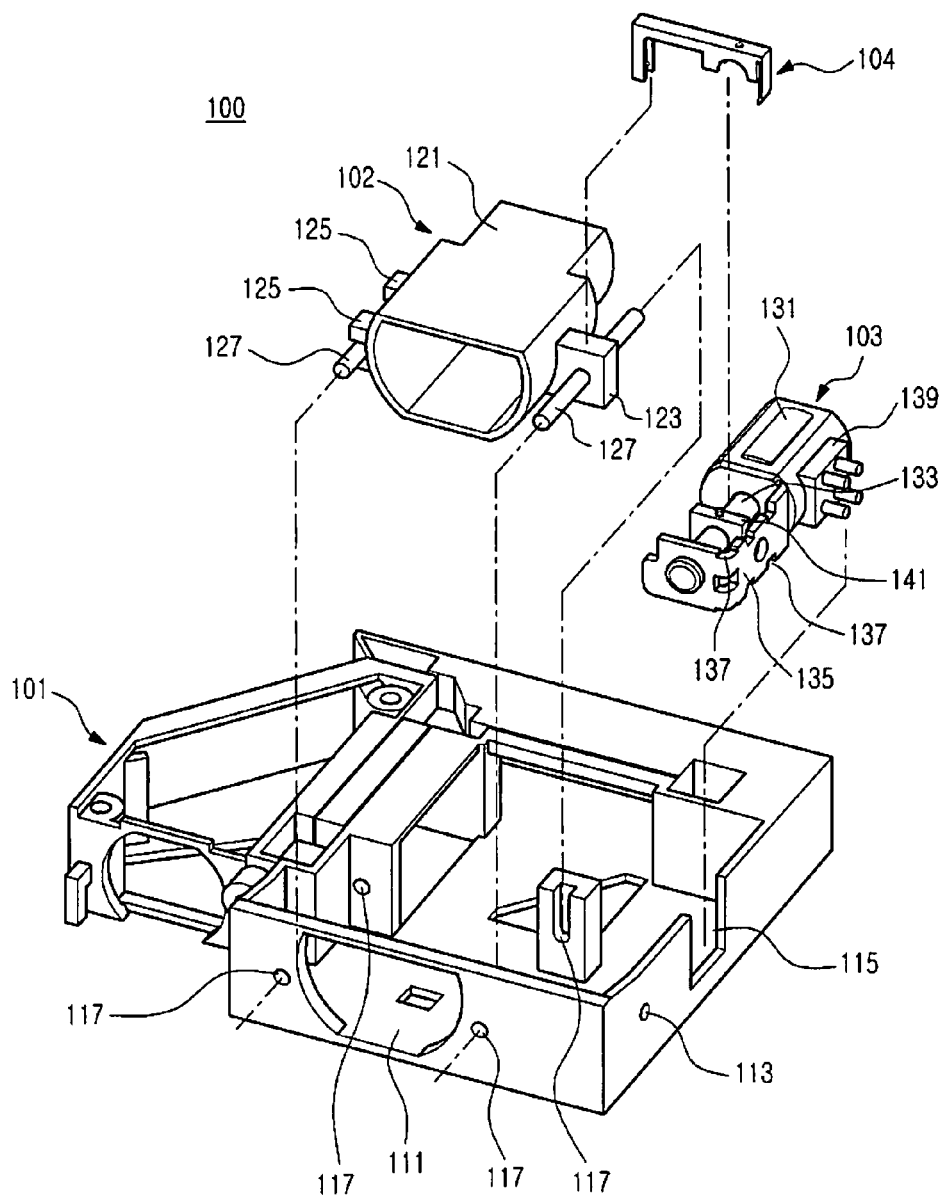
FIG. 2 is an exploded perspective view of the beam projector of FIG. 1.

As shown in FIGS. 1 and 2, a focusing device 100 for a beam projector according to an embodiment of the present invention includes a casing 101, a body tube assembly 102, and a drive motor assembly 103. A body tube 121 is connected to a drive motor 131 by a bridge 104 such that the body tube 121 is advanced or retracted in along the optical axis during the operation of the drive motor 131.

The casing 101 serves as a housing for installing the body tube assembly 102 and the drive motor assembly 103 therein. Although a light source, a liquid crystal panel, and the like are further installed on the casing 101, they will be omitted for brevity; only components operating in association with focusing will be illustrated and described.

In the casing 101 are several openings, including an opening 111 to provide a path for light emitted from a light source, a means for installing the drive motor assembly 103 and the body tube assembly 102, such as an engaging hole 113, a receiving groove 115, and a plurality of support holes 117. In an inner surface of the casing 101 there are a plurality of aligning protrusions 114 (shown in FIG. 3) around the engaging hole 113. The aligning protrusions 114 serve to fix and hold the drive shaft 133 in parallel to the advancing and retracting direction of the body tube 121 when the drive motor assembly 103 is installed.

The body tube assembly 102 includes a body tube 121 having a plurality of lenses which are aligned with the optical axis, and a guide structure for allowing the body tube 121 to be advanced or retracted in the direction of the optical axis. For the guide structure, a pair of guide rods 127, a pair of guide members 125, and a holder 123 are provided. The holder 123 is formed on an outer circumferential surface of the side of the body tube 121, and one of the guide rods 127 is slidably coupled with the holder 123 and passes through the holder 123. The guide members 125 are formed as a pair on an outer circumferential surface of another side of the body tube 121 facing the holder 123. The other guide rod 127 is slidably coupled with the guide members 125 by passing through the guide members 125. As mentioned previously, the casing 101 includes the plurality of support holes 117, each of which is coupled with an end portion of the guide rods 127 to fix them to the casing.

Once the body tube assembly 102 is installed on the casing 101, the body tube 121 is disposed to correspond to the opening 111 at an end thereof and is advanced or retracted by guidance of the guide rods 127 in the direction of the optical axis, that is, in the direction that images are projected.

The drive motor assembly 103 includes a drive motor 131, a drive shaft 133 extending from the drive motor 131, and a movable member 141 moving in the direction of the optical axis. The movable member 141 is screw-coupled to the drive shaft 133, and upon rotation of the drive shaft 133 with the operation of the drive motor 131, the movable member 141 moves with the rotation of the drive shaft 133 in a direction that the drive shaft 133 extends.

Figure 3:
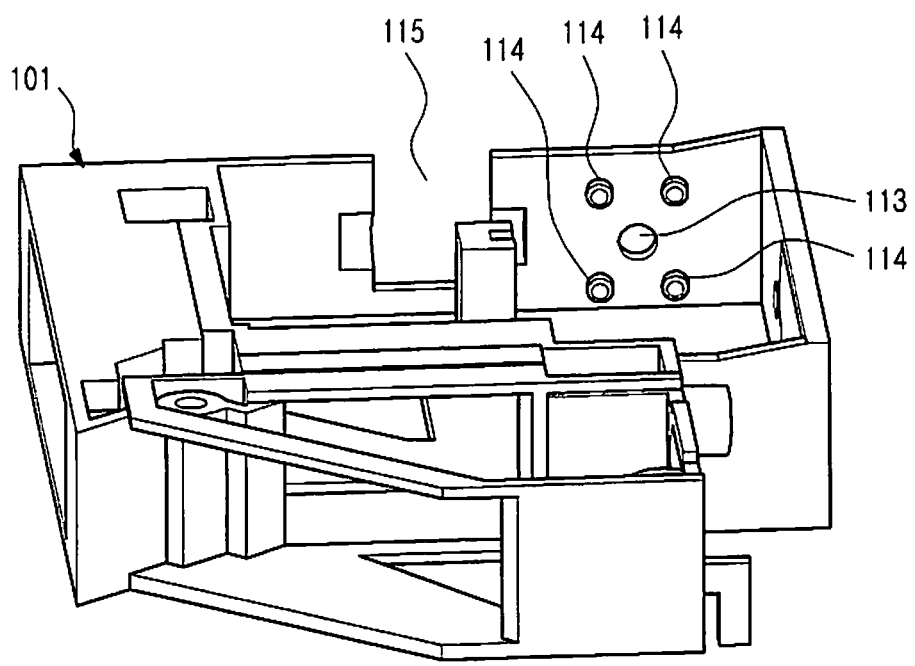
FIG. 3 is a perspective view illustrating a casing of the beam projector of FIG. 2.
Figure 4:
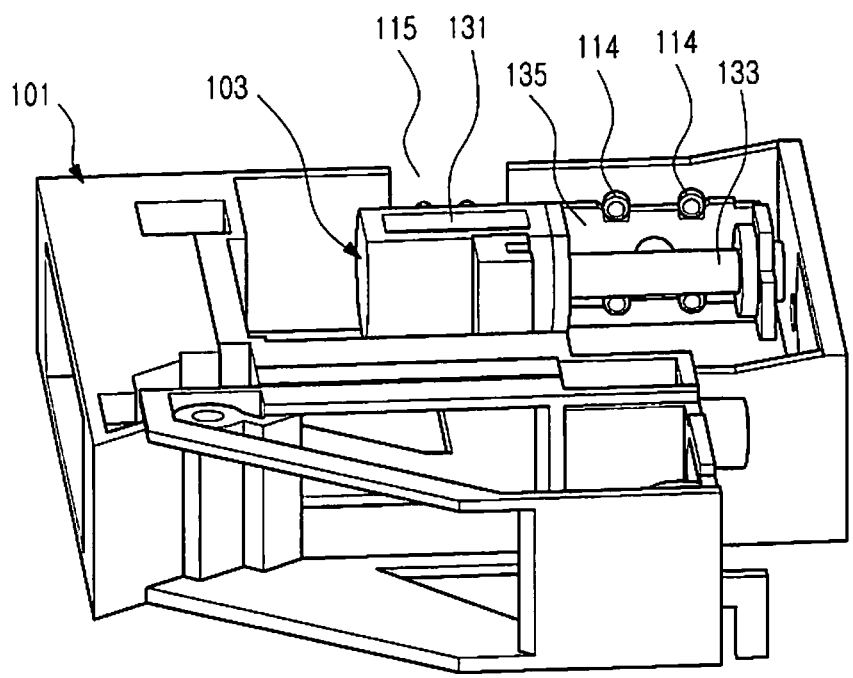
FIG. 4 is a perspective view illustrating a drive motor assembled with the beam projector of FIG. 3.
Figure 5:
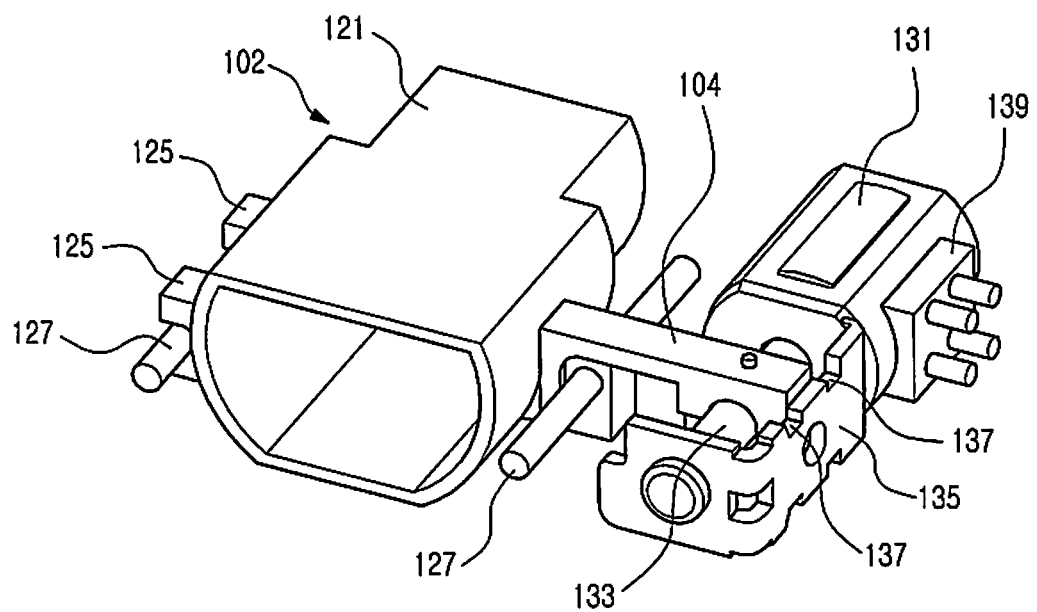
FIG. 5 is a perspective view illustrating the drive motor of the beam projector of FIG. 2 coupled with a body tube assembly.

In the drive motor assembly 103 is an aligning member 135 which is in such a shape that both ends thereof are bent while facing each other. One end of the aligning member 135 is fixed to the drive motor 131 and the other end supports an end portion of the drive shaft 133. In an outer circumferential surface of the aligning member 135 are formed a plurality of aligning grooves 137 which are engaged with the aligning protrusions 114, respectively, once the drive motor assembly 103 is installed on the casing 101. The drive shaft 133 is installed on the casing 101 while being aligned in a predetermined direction. The aligning direction of the drive shaft 133 is parallel to the optical direction; more specifically, the advancing or retracting direction of the body tube 121. FIGS. 3 and 4 illustrate such an aligning structure of the drive motor 131.

The aligning member 135 is fixed to the casing 101 by welding or an engaging means such as a screw. In the current embodiment, the aligning member 135 is fixed by a screw. When the aligning member 135 is fixed to the casing 101 a rotation force generated by screw-engagement may twist a position of the aligning member 135, but by means of engagement between the aligning protrusions 114 and the aligning grooves 137, the aligning member 135 can be fixed at a predetermined position without being rotated.

On an outer circumferential surface of the drive motor 131 is an engaging member 139 which is coupled to the receiving groove 115 of the casing 101. The engaging member 139 may also be used as an aligning means of the driving motor 131. When compared to the aligning member 135, the engaging member 139 is far away from the drive shaft 133. If the position of the engaging member 139 is slightly twisted, the driving shaft 133 cannot maintain its alignment parallel with the optical axis. By installing the aligning member 135, the drive shaft 133 can be precisely aligned and the aligning state thereof can be maintained stably.

Figure 7:
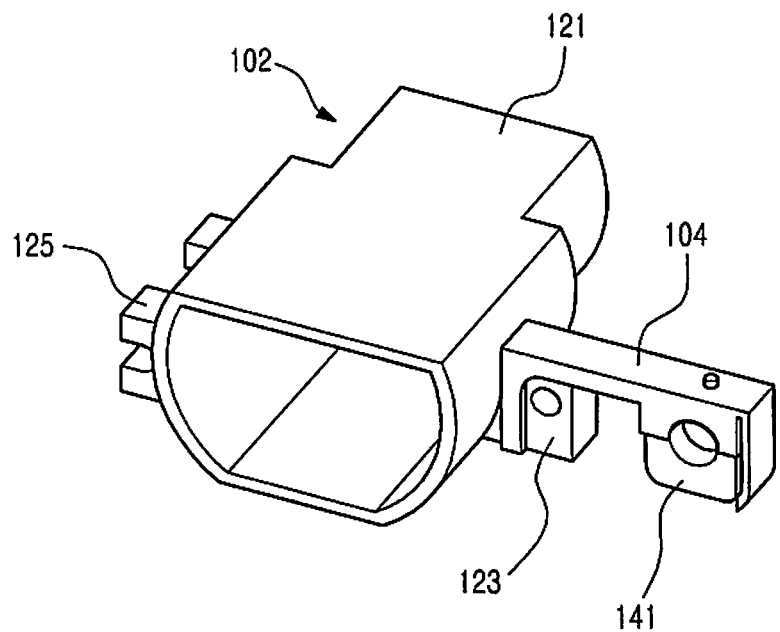
FIG. 7 is a perspective view illustrating the body tube assembly of FIG. 5 coupled with the bridge.
Figure 8:
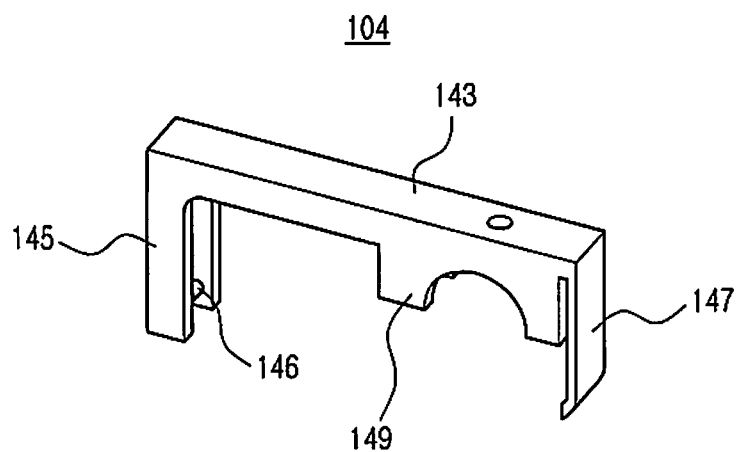
FIG. 8 is a perspective view illustrating the bridge shown in FIG. 7.

Referring to FIGS. 7 and 8, the bridge 104 is intended to connect the movable member 141 installed on the drive motor assembly 103 with the body tube 121. At an end of the connecting portion 143 of the movable member 141 are first fixing pieces 145 covering both surfaces of the holder 123, and at another end is a second fixing piece 147 coupled to cover an outer circumferential surface of the movable member 141. The first fixing pieces 145 extend from the connecting portion 143 of the bridge 104 while facing each other, and apply pressure to both surfaces of the holder 123 with its elastic force. On inner surfaces of the first fixing pieces 145 contain support protrusions 146 for applying pressure to the holder 123.

The second fixing piece 147 extends to cover a first side of the movable member 141, an end portion thereof is bent in a direction covering at least a portion of a second side of the movable member 141. The second side is an outer circumferential surface extending from the first side in a bent direction. The second fixing piece 147 applies pressure to the movable member 141 to urge an inner circumferential surface of the movable member 141 to closely contact the outer circumferential surface of the drive shaft 133.

The bridge 104 also includes third fixing pieces 149 to be coupled with the movable member 141 while covering both sides of the movable member 141.

If the holder 123, the bridge 104, the movable member 141, and the drive shaft 133 all are manufactured at their maximum tolerances, the advancing or retracting movement of the body tube 121 is not smooth, causing an overload to the drive motor 131 or a loss of coupling between those parts and thus failing to accurately deliver the drive force of the drive motor 131 to the body tube 121.

If the drive motor 131 is overloaded during normal-operating conditions, it has to be alleviated by re-coupling the drive shaft 133 with the movable member 131 or the holder 123 with the guide rod 127. On the other hand, the first fixing piece 145 and the second fixing piece 147 of the bridge 104 apply pressure to the holder 123 with their elastic forces and also urge the movable member 141 to closely contact the drive shaft 133, thereby accurately delivering the drive force of the drive motor 131 to the body tube 121. That is, the bridge 104 not only connects the holder 123 with the movable member 141, but also accurately delivers the drive force of the drive motor 131 to the body tube 121, thereby allowing the body tube to be advanced or retracted.

To detect the position of the body tube 121, the focusing device 100 may include a position detecting sensor 119 and a reflecting member 129. Out-of-range operation of the drive motor 131 can be prevented by stopping the operation of the drive motor 131 when the body tube 121 reaches a position where it cannot be advanced or retracted any more. In other words, if the load imposed to the drive motor 131 exceeds a predetermined level during the operation of the drive motor 131, the operation of the drive motor 131 is stopped. In one embodiment, when the body tube 121 reaches a predetermined position, a signal for stopping the operation of the drive motor 131 is generated, thereby controlling the operation of the drive motor 131.

Figure 6:
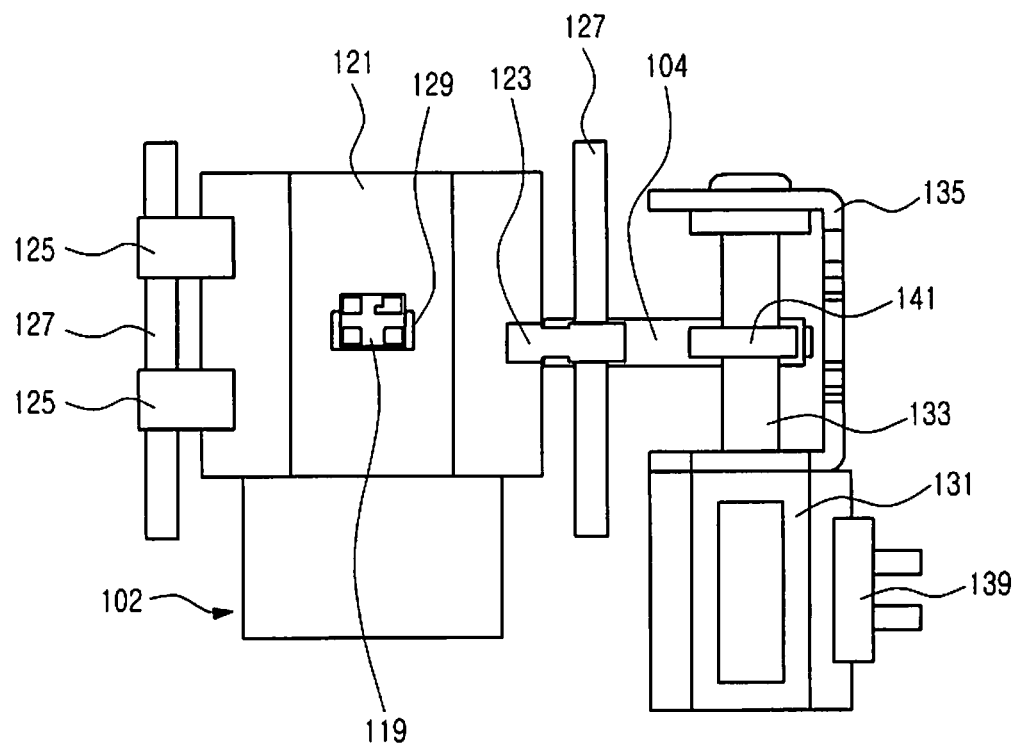
FIG. 6 is a bottom view illustrating the drive motor and the body tube assembly of FIG. 5 coupled together.

Referring to FIG. 6, a light emitting diode (LED) and a photo diode (PD) installed on the bottom surface of the casing 101 are used as the position detecting sensor 119, and the reflecting member 129 is installed on the body tube 121. The LED and the PD may be mounted on a single circuit board. A groove is formed in the bottom surface of the body tube 121 to receive the reflecting member 129, thereby preventing the reflecting member 129 from protruding from the outer circumferential surface of the body tube 121.

The reflecting member 129 selectively faces the position detecting sensor 119 as the body tube 121 is advanced or retracted. When the reflecting member 129 and the position detecting sensor 119 are positioned to face each other, light emitted from the LED is reflected from the reflecting member 129 and is incident to the PD. Once the light is incident to the PD, the position detecting sensor 191 recognizes that the body tube 121 has reached a limit position and thus generates a signal for stopping the operation of the drive motor 131.

If the reflecting member 129 is formed long along the optical axis, light may be incident to the PD as long as the body tube 12 moves within a particular range. In this case, at a point in time when the body tube 121 moves out of the range and the light is not incident to the PD, the signal for stopping the operation of the drive motor 131 may be generated.

In the focusing device 100 structured as described above, the drive shaft 133 can be easily disposed in parallel with the advancing or retreating direction of the body tube 121 by means of the aligning member 135 where the aligning grooves 137 are formed, and the aligning protrusions 114. Moreover, the bridge 104 maintains close contacts between parts from the drive shaft 133 to the holder 123 by means of its elastic force, thereby accurately delivering the drive force of the drive motor 131 to the body tube 121. Furthermore, by detecting the position of the body tube 121 using the position detecting sensor 119, it is possible to prevent overloading the drive motor 131.

The focusing device for a beam projector structured as described above is easy to scale down, thus being mountable on a portable apparatus. Moreover, focusing is achieved with the drive motor without a need to install a separate focusing knob, thereby expanding the potential locations of the beam device. Accordingly, it is easier to install the beam projector in an apparatus that has a compact mounting space, such as a portable terminal.

While the present invention has been shown and described with reference to certain embodiments thereof, it will be understood by those skilled in the art that various changes in form and detail may be made therein without departing from the spirit and scope of the invention as defined by the appended claims.

What is claimed is:

1. A focusing device for a beam projector, the focusing device comprising:
   a casing;
   a body tube comprising at least one lens, the body tube being advanced or retracted in a direction of an optical axis in the casing;
   a movable member provided at a side of the body tube, the movable member moving in parallel to the direction of the optical axis;
   a bridge fixed to the body tube and coupled with the movable member to cover at least a part of the movable member, wherein the bridge comprises a second fixing piece extending from another end of the bridge to cover an outer circumferential surface of the movable member; and
   a drive motor fixed in the casing and located at a side of the body tube,
   wherein the movable member is screw-coupled with a drive shaft of the drive motor and the second fixing piece urges an inner circumferential surface of the movable member to closely contact an outer circumferential surface of the drive shaft by applying pressure to the movable member so that the movable member linearly reciprocates as the drive motor operates, whereby the body tube is advanced or retracted.

2. The focusing device of claim 1, wherein the second fixing piece has a bent end portion to cover a first side of the movable member and a part of a second side, the second side extending in a bent form from the first side.

3. The focusing device of claim 1, wherein the body tube comprises a holder formed on an outer circumferential surface of a side of the body tube, and the bridge comprises a pair of first fixing pieces extending from an end of the bridge to cover both surfaces of the holder and support protrusions formed on inner sides of the first fixing pieces to face each other, the support protrusions applying pressure to both surfaces of the holder.

4. The focusing device of claim 1, further comprising:
   at least one guide rod extending in parallel to the direction of the optical axis and being fixed to the casing; and at least one guide member formed on an outer circumferential surface of the body tube and slidably coupled to an outer circumferential surface of the guide rod, wherein the body tube is advanced or retracted by the guide rod.

5. The focusing device of claim 4, further comprising:

a holder formed on the outer circumferential surface of the body tube in a position spaced apart from the guide member; and another guide rod slidably coupled to the holder by passing through the holder to guide the advancing or retracting movement of the body tube, wherein an end of the bridge is coupled to cover the both surfaces of the holder.

6. The focusing device of claim 1, further comprising:

an aligning member, an end of which is fixed to a body of the drive motor and another end of which supports an end portion of the drive shaft of the drive motor;

a plurality of aligning grooves formed in the aligning member; and aligning protrusions formed on the casing, wherein the aligning member is disposed such that the aligning member is fixed to the casing and the aligning grooves are engaged with the aligning protrusions, respectively.

7. The focusing device of claim 1, further comprising a position detecting sensor mounted on the casing, the position detecting sensor generating a signal for stopping an operation of the drive motor according to the position of the body tube.

8. The focusing device of claim 7, wherein the position detecting sensor comprises a light emitting diode (LED) and a photo diode (PD), the focusing device further comprises a reflecting member disposed in a predetermined position in the body tube, and when the body tube moves out of a moving range for focal length control, the reflecting member is positioned to face the LED and the PD and reflects light emitted from the LED to the PD.

* * * * *